(12) United States Patent
Uchino et al.

(10) Patent No.: US 10,069,616 B2
(45) Date of Patent: Sep. 4, 2018

(54) USER EQUIPMENT AND METHOD

(71) Applicant: NTT DOCOMO, INC., Tokyo (JP)

(72) Inventors: Tooru Uchino, Tokyo (JP); Kazuki Takeda, Tokyo (JP); Satoshi Nagata, Tokyo (JP); Liu Liu, Beijing (CN); Qin Mu, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 29 days.

(21) Appl. No.: 15/114,172

(22) PCT Filed: Jan. 23, 2015

(86) PCT No.: PCT/JP2015/051764
§ 371 (c)(1),
(2) Date: Jul. 26, 2016

(87) PCT Pub. No.: WO2015/115311
PCT Pub. Date: Aug. 6, 2015

(65) Prior Publication Data
US 2017/0005777 A1  Jan. 5, 2017

(30) Foreign Application Priority Data
Jan. 30, 2014 (JP) .................. 2014-016005

(51) Int. Cl.
*H04L 5/14* (2006.01)
*H04W 72/04* (2009.01)
(Continued)

(52) U.S. Cl.
CPC .......... *H04L 5/1438* (2013.01); *H04L 1/1812* (2013.01); *H04L 5/001* (2013.01);
(Continued)

(58) Field of Classification Search
CPC ... H04L 5/1438; H04L 1/1812; H04L 5/0092; H04L 5/0028; H04L 5/001; H04L 5/1469;
(Continued)

(56) References Cited

U.S. PATENT DOCUMENTS

| 2012/0257552 A1 | 10/2012 | Chen et al. | |
| 2015/0036563 A1* | 2/2015 | Hurd .................. | H04W 72/14 370/281 |

(Continued)

FOREIGN PATENT DOCUMENTS

WO    2012/142123 A2    10/2012

OTHER PUBLICATIONS

Office Action dated Oct. 18, 2016, in corresponding Japanese Patent Application No. 2014-016005 (with translation) (5 pages).
(Continued)

*Primary Examiner* — Hassan Kizou
*Assistant Examiner* — Abdullahi Ahmed
(74) *Attorney, Agent, or Firm* — Osha Liang LLP

(57) ABSTRACT

Some techniques are disclosed for determining downlink control information for use in each cell in carrier aggregation using a FDD cell and a TDD cell together. One aspect of the present invention relates to user equipment, comprising: a transmission and reception unit configured to transmit and receive a radio channel to/from a base station via multiple cells configured for carrier aggregation in accordance with a frequency division duplex (FDD) mode and a time division duplex (TDD) mode; a cell management unit configured to manage the multiple cells; and a communication control unit configured to determine whether a duplex mode applied to a primary cell in the multiple cells is either the FDD mode or the TDD mode and receive and demodu-
(Continued)

late downlink control information compliant with the determined duplex mode for each carrier aggregation implemented cell.

6 Claims, 9 Drawing Sheets

(51) Int. Cl.
   *H04L 5/00* (2006.01)
   *H04L 1/18* (2006.01)
   *H04W 88/02* (2009.01)
   *H04W 88/08* (2009.01)

(52) U.S. Cl.
   CPC .......... *H04L 5/0028* (2013.01); *H04L 5/0092* (2013.01); *H04L 5/1469* (2013.01); *H04W 72/042* (2013.01); *H04W 72/0413* (2013.01); *H04W 88/02* (2013.01); *H04W 88/08* (2013.01)

(58) Field of Classification Search
   CPC ........... H04W 72/0413; H04W 72/042; H04W 88/08; H04W 88/02
   See application file for complete search history.

(56) References Cited

U.S. PATENT DOCUMENTS

| | | | | |
|---|---|---|---|---|
| 2015/0085711 A1* | 3/2015 | Wang | ........................ | H04L 5/14 370/280 |
| 2015/0117275 A1* | 4/2015 | Park | ..................... | H04L 1/1812 370/280 |
| 2016/0255649 A1* | 9/2016 | Kusashima | ........... | H04W 28/06 370/280 |

OTHER PUBLICATIONS

International Search Report issued in PCT/JP2015/051764 dated Mar. 31, 2015 (1 page).
Written Opinion of the International Searching Authority issued in in PCT/JP2015/051764 dated Mar. 31, 2015 (4 pages).
Qualcomm Incorporated; "Procedures for dual connectivity"; 3GPP TSG RAN2#84, R2-134002; San Francisco, USA; Nov. 11-15, 2013 (5 pages).
Nokia Corporation; "Updated WID: LTE TDD-FDD joint operation including Carrier Aggregation-Core Part"; 3GPP TSG RAN meeting #61, RP-131399; Porto, Portugal; Sep. 3-6, 2013 (19 pages).
Extended European Search Report issued in the counterpart European Patent Application No. 15743669.2, dated Dec. 16, 2016 (9 pages).
NTT DOCOMO; "On the need of PUCCH on multiple UL serving cells for TDD-FDD CA"; 3GPP TSG RAN WG1, Meeting #75, R1-135513; San Francisco, USA; Nov. 11-15, 2013 (9 pages).
NTT DOCOMO; "Views on Possible Solutions for TDD-FDD Joint Operation"; 3GPP TSG RAN WG1, Meeting #74, R1-133455; Barcelona, Spain; Aug. 19-23, 2013 (3 pages).
Yong Li, et al.; "Control Channel Design for Carrier Aggregation between LTE FDD and LTE TDD Systems"; 2012 IEEE 75th Vehicular Technology Conference (VTC Spring 2012); Yokohama, Japan; May 6-9, 2012 (5 pages).
Office Action issued in corresponding Japanese Application No. 2014-016005, dated Jan. 24, 2017 (3 pages).

* cited by examiner

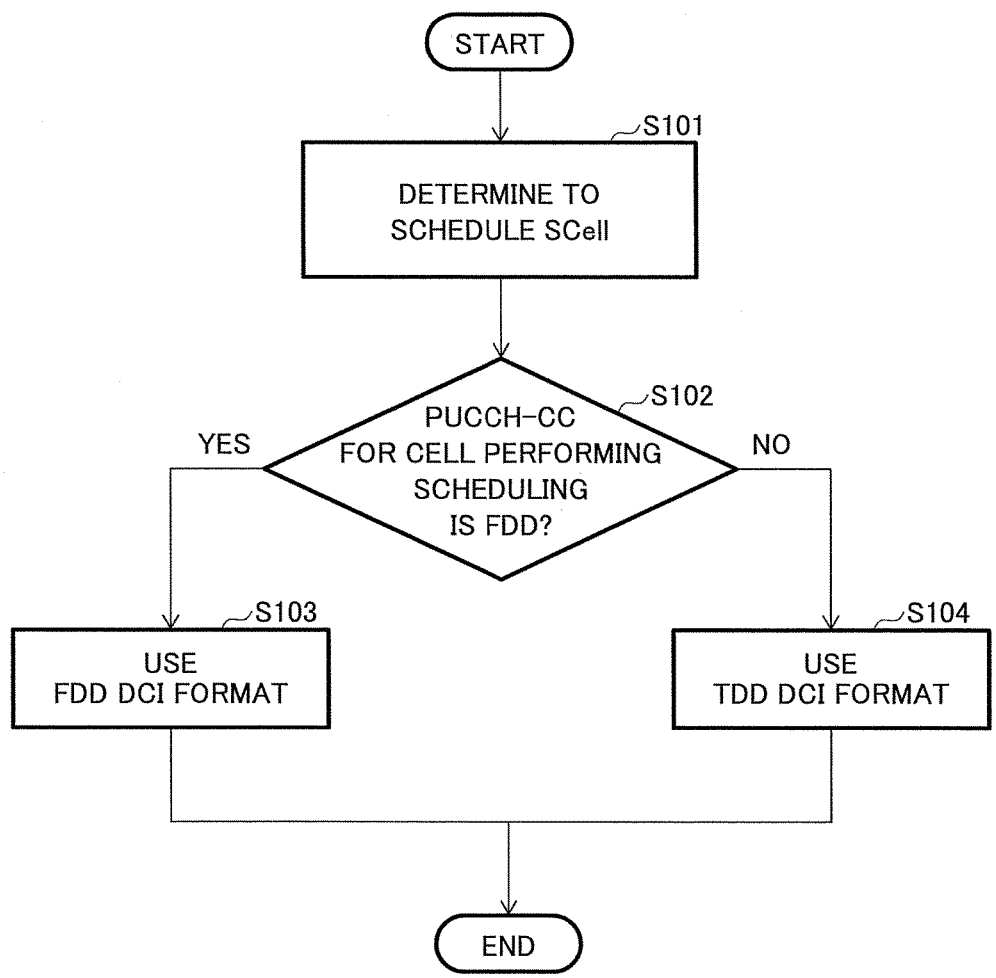

USER EQUIPMENT AND METHOD

TECHNICAL FIELD

The present invention relates to a radio communication system using carrier aggregation.

BACKGROUND ART

In LTE (Long Term Evolution), two duplex modes, a frequency division duplex (FDD) mode and a time division duplex (TDD) mode, are defined. In the FDD mode, uplink communication and downlink communication are performed in mutually different frequency bands, and in the TDD mode, uplink communication and downlink communication use an identical frequency band where the uplink communication and the downlink communication are separated in time. In the TDD mode, a ratio of time assigned for uplink/downlink is not limited to 1:1, and different ratios can be applied. Switching between the duplex modes can be performed in inter-frequency handover.

Meanwhile, intra-base station carrier aggregation (intra-eNB CA) has been supported since LTE specification Rel-10. In the carrier aggregation, throughput can be improved by using a bundle of multiple component carriers (CCs).

See 3GPP TSG RAN meeting #61 RP-131399 in detail, for example.

SUMMARY OF INVENTION

Problem to be Solved by the Invention

In LTE specifications Rel-10 and Rel-11, however, each cell in the carrier aggregation is limited to the same duplex mode, as illustrated in FIG. 1. In other words, it is presumed that all cells configured for the carrier aggregation use either the FDD mode or the TDD mode. In LTE specification Rel-12, as illustrated in FIG. 2, intra-eNB CA where a mixture of the FDD mode and the TDD mode is used (FDD+TDD intra-eNB CA) is discussed.

In addition, in LTE specification Rel-12, inter-base station carrier aggregation (inter-eNB CA) is also discussed. In the inter-eNB CA, non-ideal backhaul connection is assumed between base stations (eNBs), and also in the inter-eNB CA, it is desirable that the both duplex modes can be used (FDD+TDD inter-eNB CA). Also in the intra-eNB CA, a single scheduler is used, UCI (Uplink Control Information) feedback to only a primary cell (PCell or PCC) is sufficient. In the inter-eNB CA, however, multiple independent schedulers are used, and the UCI feedback is necessary in each cell or component carrier (CC). For example, in downlink HARQ (Hybrid Automatic Repeat Request), ACK/NACK feedback for received downlink data is necessary. In the intra-eNB CA, it is sufficient to feed the ACK/NACK back to only the PCell, but it is necessary to feed the ACK/NACK back to each CC in the inter-eNB CA.

Some bits are provided to DCI (Downlink Control Information) for the TDD mode, although the bits are not provided to the DCI for the FDD mode. For example, downlink DAI (Downlink Assignment Index) and uplink DAI included in the DCI for the TDD mode are not in the DCI for the FDD mode. Also, HARQ (Hybrid Automatic Repeat Request) process number indication bits occupy three bits in the DCI for the FDD mode, although they occupy four bits in the DCI for the TDD mode.

The downlink DAI is provided as two bits in downlink assignment and is counted for each assignment of a downlink subframe. As illustrated in solid arrows in FIG. 3, for example, if four downlink subframes are assigned, the value of the downlink DAI is counted as 1, 2, 3 and 4 in the two-bits value for each DCI for indicating each subframe assignment. User equipment (UE) checks the downlink DAI, and if the DAI values of detected PDCCHs (Physical Downlink Control Channels) are not in sequence, the user equipment can determine that the DCI detection has been mistaken.

The uplink DAI is provided as two bits in an uplink grant and indicates the total number of assigned PDSCHs (Physical Downlink Shared Channels). As illustrated in dotted arrows in FIG. 3, for example, if four downlink subframes are assigned, the uplink DAI value is set to four. The UE can check the uplink DAI to determine the total number of downlink assignments. Also, if the user equipment performs UCI feedback in the PUSCH triggered by the uplink grant, no ambiguity arises for the number of bits punctured in ACK/NACK.

The HARQ process number indication bits indicative of a HPN (HARQ Process Number) indicator for the TDD mode are provided as four bits in any of downlink and uplink and are greater than the HARQ process number indication bits for the FDD mode provided as three bits. This is because a HARQ timing in the TDD mode is longer than that in the FDD mode and the maximum number of HARQ processes is equal to 15 in the TDD mode whereas the maximum number of HARQ processes is equal to 8 in the FDD mode.

It is necessary to determine the DCI for use in the FDD+TDD CA in consideration of differences of the DCI between the TDD mode and the FDD mode as stated above. For example, it is assumed that FDD mode compliant DCI is used in FDD cells while TDD mode compliant DCI is used in TDD cells. Here, in the case where the FDD cell is PCell and a PUCCH is transmitted in the PCell (case 1), acknowledgement (ACK/NACK) signal transmission timings (downlink HARQ timings) for downlink assignment would be a timing in the FDD mode. In FIG. 4, downlink assignments and ACK/NACK signal transmission timings thereto are illustrated in arrows. In this manner, the downlink HARQ timing for the FDD mode is applied in the FDD cells, and the downlink HARQ timing for the FDD mode is also applied in the TDD cells. Accordingly, the DAI is unnecessary in the TDD cell, and it is sufficient to provide three bits to the HPN indicator. In this manner, in case 1, there is a likelihood that communication capacity may be reduced due to unnecessary overhead or coverage may be degraded.

On the other hand, in the case where the TDD cell is the PCell and a PUCCH is transmitted in the PCell (case 2), acknowledgement (ACK/NACK) signal transmission timings (downlink HARQ timings) for downlink assignments would be TDD mode based timings, because there are a limited number of uplink subframes in the PCell that can transmit the PUCCH. In FIG. 5, downlink assignments and ACK/NACK signal transmission timings thereto are illustrated in arrows. In this manner, the downlink HARQ timing for the TDD mode is applied in TDD cells, and the downlink HARQ timing for the TDD mode is also applied in the FDD cell. Accordingly, the DAI is required in the FDD cell, and four bits are also required for the HPN indicator. In this manner, in case 2, since the required bits do not exist, appropriate HARQ and scheduling cannot be performed, which may degrade the throughput.

In light of the above-stated problems, one object of the present invention is to provide some techniques for determining downlink control information for use in each cell in carrier aggregation where the FDD cell and the TDD cell are used together.

Means for Solving the Problem

In order to achieve the above object, one aspect of the present invention relates to user equipment, comprising: a transmission and reception unit configured to transmit and receive a radio channel to/from a base station via multiple cells configured for carrier aggregation in accordance with a frequency division duplex (FDD) mode and a time division duplex (TDD) mode; a cell management unit configured to manage the multiple cells; and a communication control unit configured to determine whether a duplex mode applied to a primary cell in the multiple cells is either the FDD mode or the TDD mode and use downlink control information compliant with the determined duplex mode for each carrier aggregation implemented cell.

Advantage of the Invention

According to the present invention, downlink control information for use in each cell can be determined in carrier aggregation where the FDD cell and the TDD cell are used together.

BRIEF DESCRIPTION OF DRAWINGS

FIG. 11 is a flowchart for illustrating operations to determine duplex modes of DCI according to one embodiment of the present invention.

EMBODIMENTS OF THE INVENTION

Embodiments of the present invention are described below with reference to the drawings.

Figure 1:
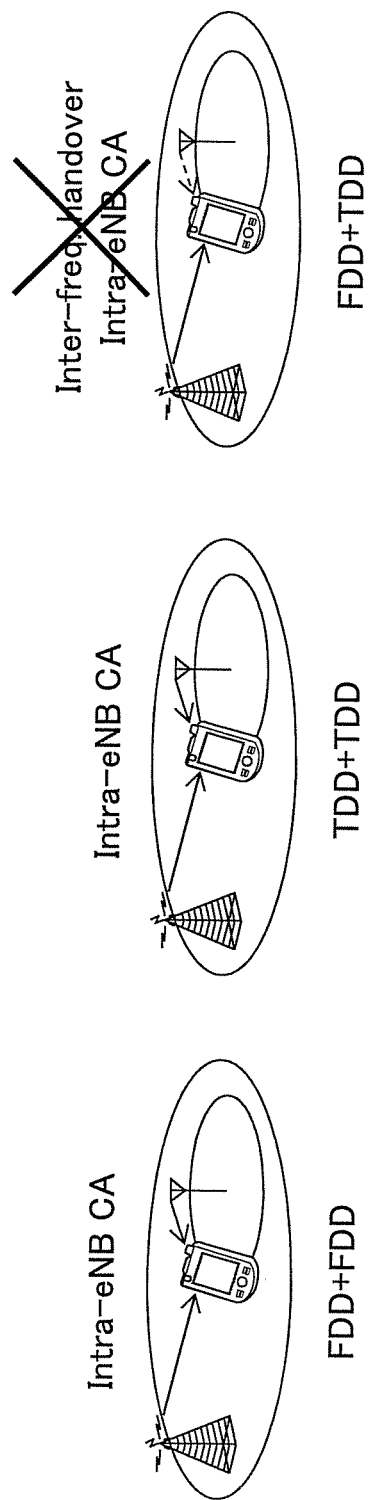
FIG. 1 is a schematic diagram for illustrating duplex modes in intra-base station CA supported by a conventional LTE system.
Figure 2:
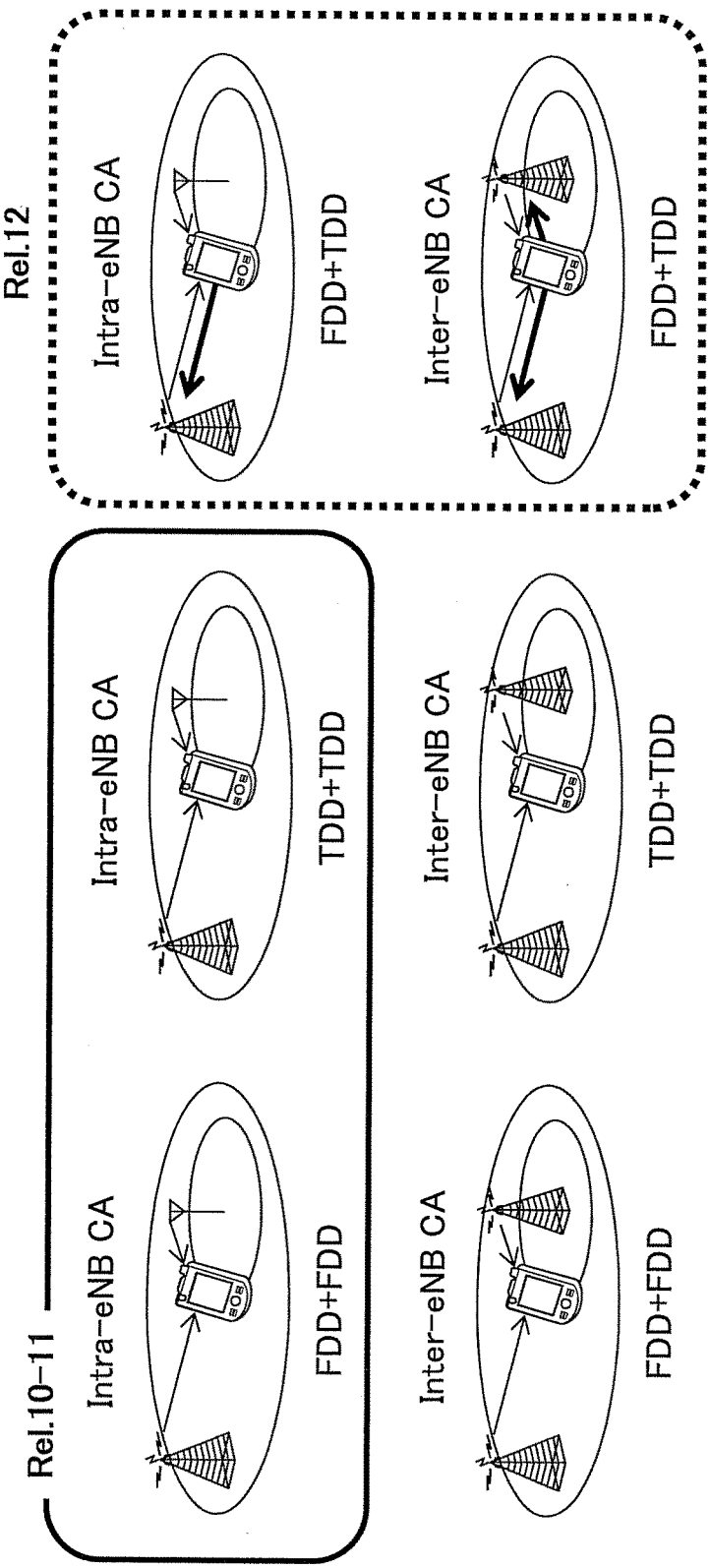
FIG. 2 is a schematic diagram for illustrating variations of the intra-base station CA and the inter-base station CA for duplex modes.
Figure 3:
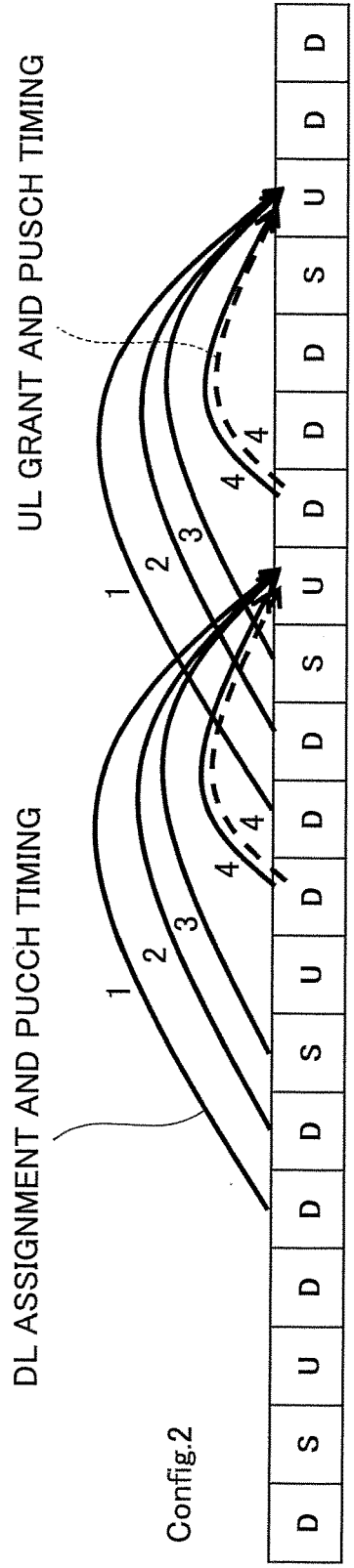
FIG. 3 is a schematic diagram for illustrating downlink DAI and uplink DAI.
Figure 4:
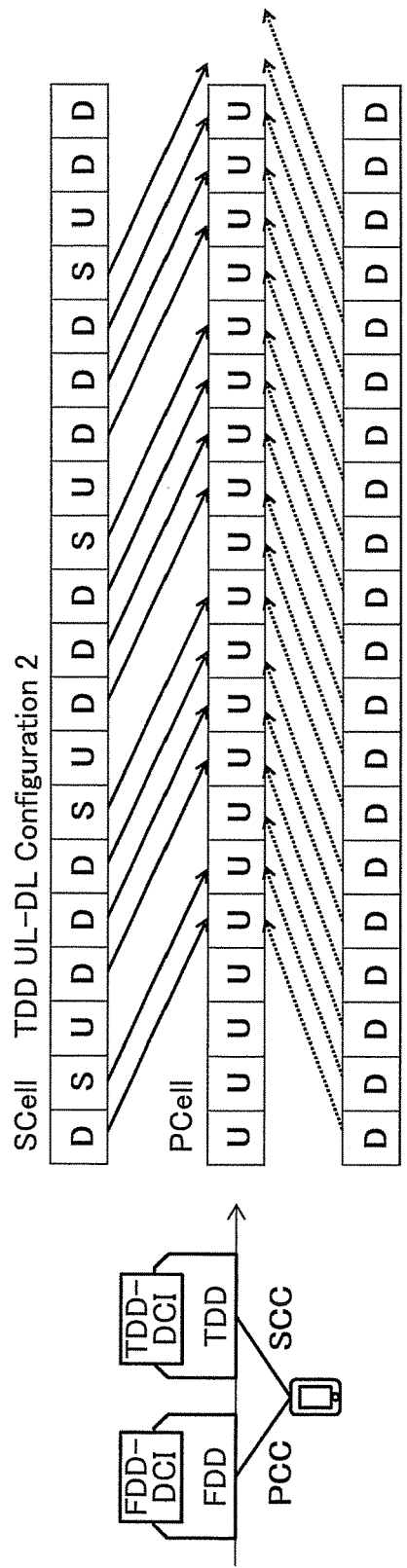
FIG. 4 is a schematic diagram for illustrating PDSCH assignment timings and acknowledgement (ACK/NACK) signal transmission timings corresponding to the PDSCH in a case where a FDD cell is a PCC.
Figure 5:
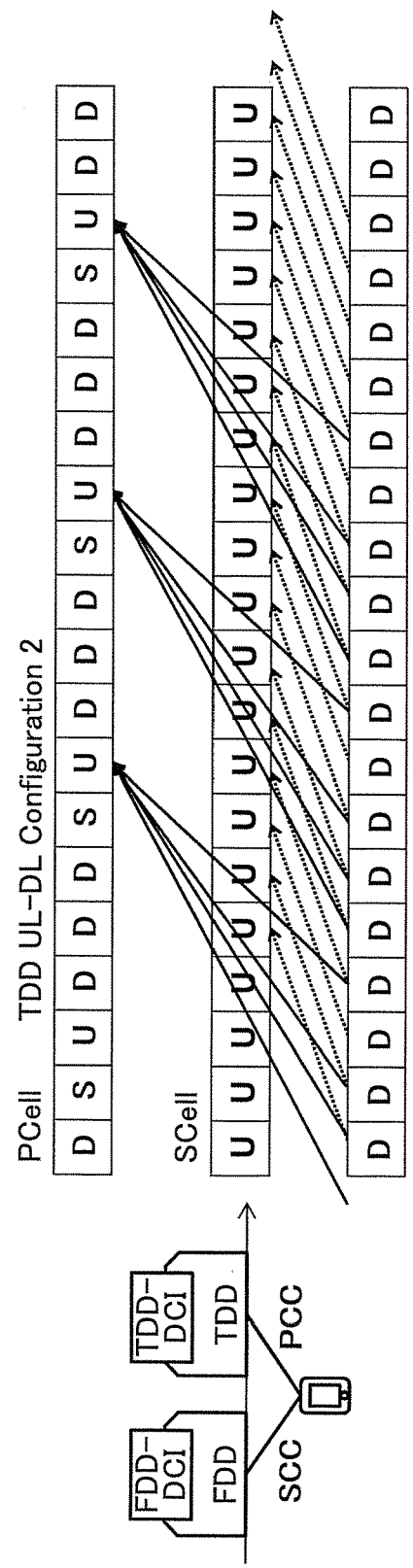
FIG. 5 is a schematic diagram for illustrating PDSCH assignment timings and acknowledgment (ACK/NACK) signal transmission timings corresponding to the PDSCH in a case where a TDD cell is a PCC.
Figure 6:
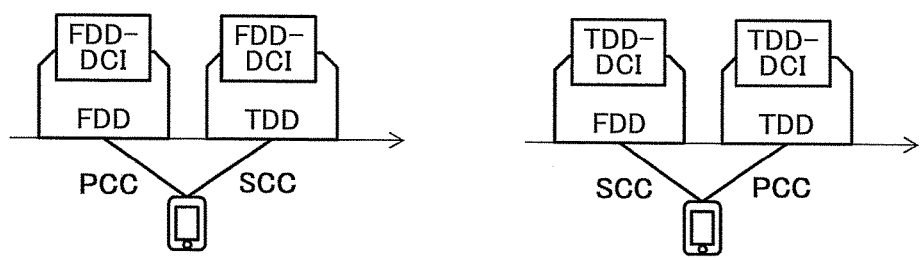
FIG. 6 is a schematic diagram for illustrating duplex modes of DCI corresponding to duplex modes of PCC according to one embodiment of the present invention.

User equipment using carrier aggregation with multiple cells where a frequency division duplex (FDD) mode and a time division duplex (TDD) mode are used together is disclosed. In embodiments as stated below, the user equipment determines whether the duplex modes applied to multiple cells are the FDD mode or the TDD mode and communicates with each cell by using downlink control information compliant with the determined duplex modes for cells where the carrier aggregation is implemented. Specifically, if the FDD mode is applied to a primary cell as illustrated in FIG. 6 (case in the left side in FIG. 6), the user equipment uses downlink control information used for the FDD mode (FDD-DCI) for each CA implemented cell regardless of whether that cell applies for the TDD mode or the FDD mode. On the other hand, if the TDD mode is applied to the primary cell (case in the right side in FIG. 6), the user equipment uses downlink control information (TDD-DCI) used for the TDD mode for each CA implemented cell regardless of whether that cell applies for the TDD mode or the FDD mode. As a result, appropriate DCI can be transmitted at HARQ timings as illustrated in FIGS. 4 and 5, which can avoid degradation of coverage and throughput.

Figure 7:
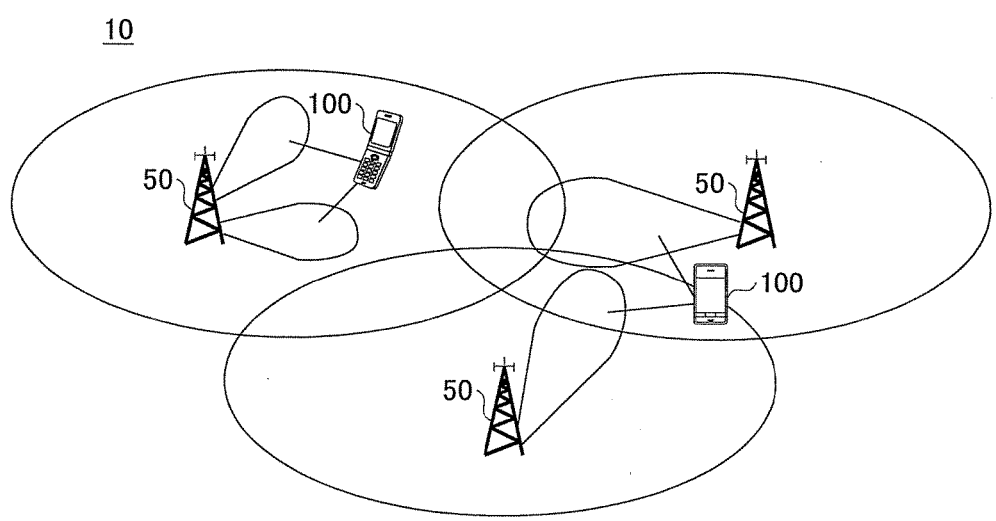
FIG. 7 is a schematic diagram for illustrating a radio communication system according to one embodiment of the present invention.

At the outset, a radio communication system according to one embodiment of the present invention is described with reference to FIG. 7. FIG. 7 is a diagram for schematically illustrating a radio communication system according to one embodiment of the present invention.

As illustrated in FIG. 7, a radio communication system 10 has one or more base stations (eNBs) 50 and one or more user equipments (UEs) 100. In this embodiment, the radio communication system 10 is an LTE-Advanced system, but is not limited to it, and may be any appropriate radio communication system supporting carrier aggregation.

In the radio communication system 10 according to this embodiment, the single base station 50 provides multiple cells for communicating with the user equipment 100 and assigns a primary cell and a secondary cell from these cells for communication with the user equipment 100 via the assigned cells (intra-base station carrier aggregation (intra-eNB CA)).

Also, the multiple base stations 50 provide multiple cells for communicating with the user equipment 100, and the primary cell and the secondary cell are assigned by the different base stations 50 to the user equipment 100 for communication with the user equipment 100 via the assigned cells (inter-base station carrier aggregation (inter-eNB CA)).

Also, in the radio communication system 10, the two duplex modes, the FDD mode and the TDD mode, are used together, and each of the cells served by the one or more base stations 50 uses any of the two duplex modes to communicate with the user equipment 100.

The base station 50 wirelessly connects to the user equipment 100 to send the user equipment 100 downlink data received from a communicatively connected upper station or server (not shown) and send the upper station (not shown) uplink data received from the user equipment 100. In this embodiment, the base station 50 is an LTE-Advanced compliant eNB, but is not limited to it, and may be any appropriate base station supporting the intra-base station carrier aggregation and the inter-base station carrier aggregation. Also, the base station 50 supports one or both of the FDD mode and the TDD mode and provides one or more cells in accordance with the supported duplex modes. In this embodiment, the base station 50 supports the intra-base station carrier aggregation for use in both the FDD mode and the TDD mode (FDD+TDD intra-eNB CA) and the inter-base station carrier aggregation for use in both the FDD mode and the TDD mode (FDD+TDD inter-eNB CA).

The user equipment 100 has a carrier aggregation function and supports both the FDD mode and the TDD mode. Typically, the user equipment 100 is a mobile phone, a smartphone, a tablet, a mobile router and so on, but is not limited to them, and may be any appropriate user equipment having a radio communication function. In a typical hardware arrangement, the user equipment 100 has a CPU (Central Processing Unit) such as a processor, a memory device such as a RAM (Random Access Memory), an auxiliary storage device such as a hard disk device, a communication device for communicating radio signals, an interface device for interfacing with users, and so on. Functions of the user equipment 100 as stated below can be implemented by the CPU loading data and programs stored in the auxiliary storage device via the communication device and/or the interface device into the memory device and processing the data in accordance with the loaded programs.

Figure 8:
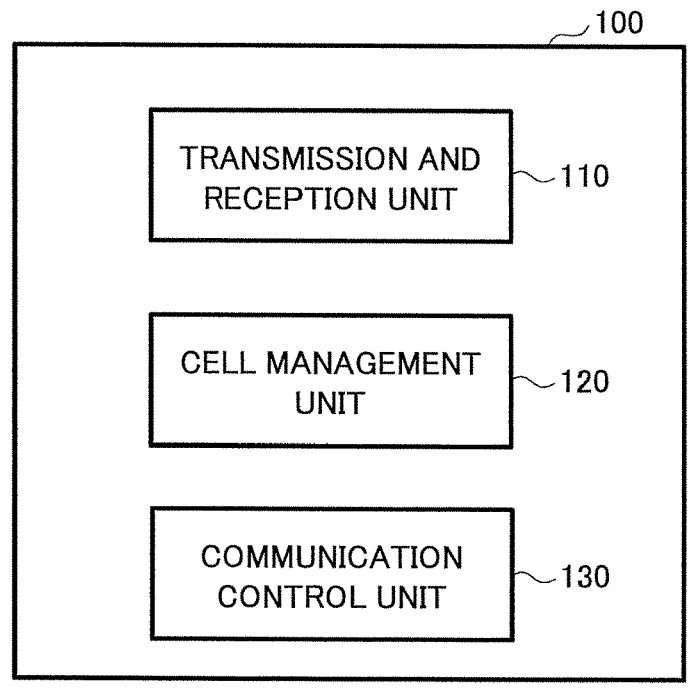
FIG. 8 is a block diagram for illustrating an arrangement of user equipment according to one embodiment of the present invention.

Next, an arrangement of user equipment according to one embodiment of the present invention is described with reference to FIG. 8. FIG. 8 is a diagram for illustrating an arrangement of the user equipment according to one embodiment of the present invention.

As illustrated in FIG. 8, the user equipment 100 has a transmission and reception unit 110, a cell management unit 120 and a communication control unit 130.

The transmission and reception unit 110 transmits and receives a radio channel to/from the base station 50 via multiple cells configured for carrier aggregation in accordance with the FDD mode and the TOP mode. Specifically, the transmission and reception unit 110 transmits and receives various radio channels such as uplink/downlink control channels and uplink/downlink data channels to/from the base station 50. In the LTE-Advanced compliant radio communication system 10, the user equipment 100 receives various downlink channels such as a PDCCH (Physical Downlink Control Channel) and a PDSCH (Physical Downlink Shared Channel) from the base station 50 and transmits various uplink channels such as a PRACH (Physical Random Access Channel), a PUCCH (Physical Uplink Control Channel), a PUSCH (Physical Uplink Shared Channel) and a SRS (Sounding Reference Symbol) to the base station 50.

As stated above, the radio communication system 10 supports carrier aggregation, and the transmission and reception unit 110 can communicate with one or more base stations 50 via a primary cell and a secondary cell under control by the communication control unit 130. For example, in the intra-base station carrier aggregation, a single base station 50 assigns the primary cell and the secondary cell from its served multiple cells to the user equipment 100 to communicate with the user equipment 100 via the cells. In this case, the transmission and reception unit 110 exchanges various radio channels with the base station 50 serving the cells. Also, in the inter-base station carrier aggregation, multiple base stations 50 assign the primary cell and the secondary cell from their serving cells to the user equipment 100 to communicate with the user equipment 100 via the cells. In this case, the transmission and reception unit 110 exchanges various radio channels with the multiple base stations 50 serving the assigned cells.

The cell management unit 120 manages multiple cells configured for the carrier aggregation in accordance with the FDD mode and the TDD mode (FDD+TDD CA). In the carrier aggregation, one primary cell (PCell or PCC) and one or more secondary cells (SCells or SCCs) are typically configured. In the FDD+TDD CA, each cell uses any duplex mode of the FDD mode and the TDD mode. The cell management unit 120 manages connectivity to a FDD cell and a TDD cell configured by the base station 50.

The communication control unit 130 determines whether a duplex mode applied to a primary cell in multiple cells is either the FDD mode or the TDD mode and controls communication with each cell to use downlink control information compliant with the determined duplex mode for each cell where the carrier aggregation is implemented. Specifically, as illustrated in FIG. 6, if the FDD mode is applied to the determined primary cell, the communication control unit 130 determines that FDD mode compliant downlink control information (FDD-DCI) is transmitted to each cell of the primary cell and the one or more secondary cells where the carrier aggregation is implemented and performs reception and demodulation. On the other hand, if the TDD mode is applied to the determined primary cell, the communication control unit 130 determines that TDD mode compliant downlink control information (TDD-DCI) is transmitted to each cell of the primary cell and the one or more secondary cells where the carrier aggregation is implemented and performs reception and demodulation. Here, the determination as to whether the duplex mode applied to each cell is either the FDD mode or the TDD mode can be made based on a frequencies band for the cell, for example. Since different frequency bands are used for the FDD mode and the TDD mode, the communication control unit 130 can determine the duplex mode applied to each cell by determining the frequency band for use in the cell. Also, the duplex mode for use in the frequency band may be indicated by an upper layer in the connecting network. Alternatively, the fact that physical channels such as a synchronization channel have different configurations between the FDD mode and the TDD mode in LTE may be used for the terminal to determine whether the cell is the FDD mode or the TDD mode at an initial connection stage conducted by receiving the physical channels.

As stated above, according to LTE specification, DCI for the TDD mode includes some information elements that are not in DCI for the FDD mode. For example, a downlink DAI (Downlink Assignment Index), an uplink DAI and a HARQ (Hybrid Automatic Repeat Request) process number indication bit, which are information elements of the DCI for the TDD mode, are not in the DCI for the FDD mode or are assigned to different numbers of bits.

The downlink DAI is provided as two bits in downlink assignment and is counted for each assignment of a downlink subframe. The user equipment 100 checks the downlink DAI, and if the DAI values of detected PDCCHs (Physical Downlink Control Channels) are not in sequence, the user equipment 100 can determine that a DCI detection has been mistaken.

The uplink DAI is provided as two bits in an uplink grant and indicates the total number of assigned PDSCHs (Physical Downlink Shared Channels). The user equipment 100 can check the uplink DAI to determine the total number of downlink assignments. Also, if the user equipment 100 performs UCI feedback in a PUSCH triggered by the uplink grant, ambiguity cannot arise for the number of bits punctured in ACK/NACK.

The HARQ process number indication bits indicative of a HPN (HARQ Process Number) indicator for the TDD mode are provided as four bits in any of downlink and uplink and are greater than the HARQ process number indication bits for the FDD mode provided as three bits. This is because a HARQ timing is longer in the TDD mode than in the FDD mode and accordingly the maximum number of HARQ processes is equal to 15 in the TDD mode whereas the maximum number of HARQ processes is equal to 8 in the FDD mode.

Figure 9:
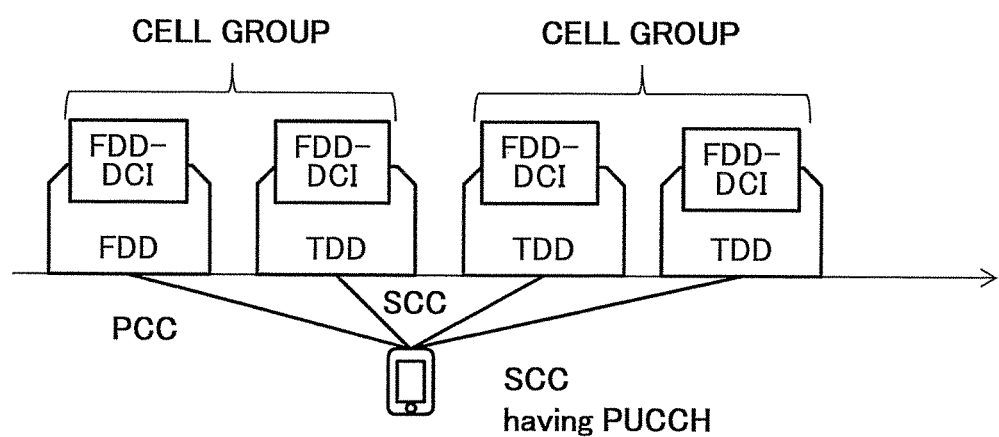
FIG. 9 is a schematic diagram for illustrating transmission of PUCCHs in multiple SCCs.

In the above-stated embodiment, the PUCCH is transmitted in a primary cell, but it is being discussed in LTE-Advanced that the PUCCH may be transmitted in one or more secondary cells (the leftmost secondary cell in FIG. 9) in addition to the primary cell. For example, in dual connectivity, two or more cells transmit the PUCCH, and the PUCCH may be transmitted in the one or more secondary cells as well as the primary cell. Similarly, it is being discussed in carrier aggregation that two or more cells transmit the PUCCH, which can offload uplink control information to multiple cells. For cells where the PUCCH is transmitted, as illustrated in FIG. 9, a cell group is composed to include the cell and other secondary cells scheduled based on the DCI fed back to the cell, and the cell management unit 120 manages the multiple cells in a per-cell group basis. Note that the primary cell is used as one of cells in the cell group for transmitting the PUCCH.

As illustrated, if the secondary cell also transmits the PUCCH, the PUCCH in the primary cell would provide uplink control information for one or more cells in its own cell group (the left-side cell group in FIG. 9) as feedback. On the other hand, the PUCCH in the secondary cell for supporting transmission of the PUCCH would provide uplink control information for one or more cells in its own cell group (the right side cell group in FIG. 9) as feedback. In the case where different duplex modes are applied in the primary cell and the secondary cell for supporting transmission of the PUCCH, if the DCI duplex mode is determined corresponding to the duplex mode in the primary cell as stated above, the above-stated problem where the DAI and the HPN indicator bits may be excessive or insufficient would arise.

Figure 10:
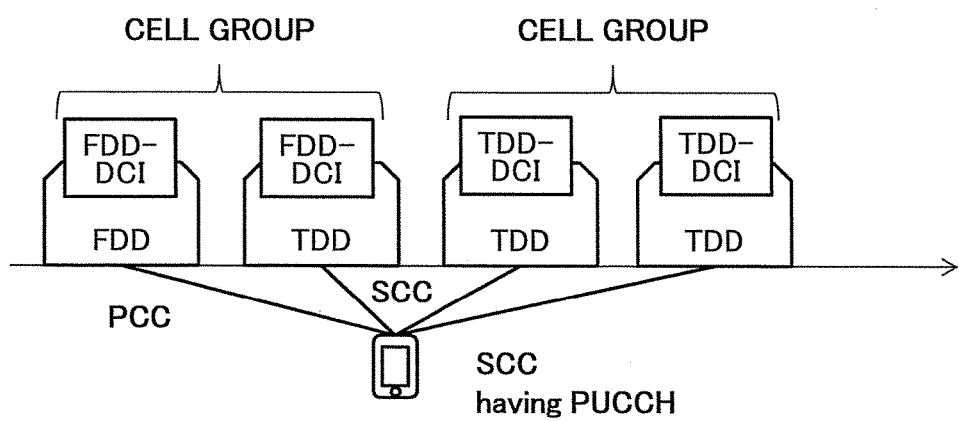
FIG. 10 is a schematic diagram for illustrating duplex modes of DCI corresponding to duplex modes of PCC according to another embodiment of the present invention.

Accordingly, in one embodiment, if the PUCCH is transmitted from not only the primary cell but also the secondary cell, depending on whether the duplex mode applied to a cell in each cell group for transmitting the PUCCH is the FDD mode or the TDD mode, the communication control unit 130 may use downlink control information compliant with the identified duplex mode for each cell in the cell group. Specifically, if the FDD mode is applied to the primary cell or the secondary cell in the cell group for transmitting the PUCCH, the communication control unit 130 determines that FDD mode compliant downlink control information (FDD-DCI) is transmitted to the cells in the cell group and performs reception and demodulation. On the other hand, if the TDD mode is applied to the primary cell or the secondary cell in the cell group for transmitting the PUCCH, the communication control unit 130 determines that TDD mode compliant downlink control information (TDD-DCI) is transmitted to the cells in the cell group and performs reception and demodulation. In the example as illustrated in FIG. 10, since the primary cell complies with the FDD mode, the FDD-DCI is transmitted to the cells in the left side cell group including the primary cell, and the user equipment will attempt to receive and demodulate the FDD-DCI. Since the secondary cell in the right side cell group for transmitting the PUCCH complies with the TDD mode, the TDD-DCI is transmitted to the cells in the right side cell group, and the user equipment will attempt to receive and demodulate the TDD-DCI.

Next, operations to determine the duplex mode of downlink control information according to one embodiment of the present invention are described. FIG. 11 is a flowchart for illustrating the operation to determine the duplex mode of the downlink control information according to one embodiment of the present invention.

As illustrated in FIG. 11, at step S101, in response to some scheduling event, the cell management unit 120 determines that scheduling is performed on a secondary cell configured for carrier aggregation.

At step S102, the communication control unit 130 determines the duplex mode for a cell (PUCCH-CC) to which downlink control information for the secondary cell is fed back. As illustrated in FIG. 6, if the user equipment 100 transmits the PUCCH to only the primary cell, the feedback destination cell would become the primary cell. On the other hand, as illustrated in FIG. 10, if the user equipment 100 transmits the PUCCH to the primary cell as well as one or more secondary cells, the feedback destination cell would become the secondary cell for transmitting the PUCCH in a cell group to which the secondary cell belongs.

If the PUCCH-CC complies with the FDD mode (S102: Yes), at step S103, the communication control unit 130 assumes that a FDD mode compliant DCI format is transmitted in the secondary cell and receives and demodulates the downlink control information. On the other hand, if the PUCCH-CC complies with the TDD mode (S102: No), at step S104, the communication control unit 130 assumes that a TDD mode compliant DCI format is transmitted in the secondary cell and receives and demodulates downlink control information.

Although the embodiments of the present invention have been described in detail, the present invention is not limited to the above-stated specific embodiments, and various modifications and variations can be made within the spirit of the present invention as recited in claims.

This international patent application claims benefit of priority based on Japanese Priority Application No. 2014-016005 filed on Jan. 30, 2014, the entire contents of which are hereby incorporated by reference.

LIST OF REFERENCE SYMBOLS

10: radio communication system
50: base station
100: user equipment
110: transmission and reception unit
120: cell management unit
130: communication control unit

The invention claimed is:
1. A user equipment, comprising:
 a transceiver that transmits and receives a radio channel to/from a base station via multiple cells configured for carrier aggregation in accordance with a frequency division duplex (FDD) mode and a time division duplex (TDD) mode; and
 a processor coupled with a memory that:
  manages the multiple cells;
  determines whether a duplex mode applied to a primary cell in the multiple cells is either the FDD mode or the TDD mode; and
  demodulates downlink control information received by the transceiver compliant with the determined duplex mode for each carrier aggregation implemented cell,
 wherein the processor further:
  manages the multiple cells in a per cell group basis where each cell group comprises multiple cells, determines whether a duplex mode applied to a cell for transmitting a physical uplink control channel (PUCCH) in each cell group is either the FDD mode or the TDD mode, and demodulates the downlink control information received by the transceiver compliant with the determined duplex mode for each cell in each cell group.

2. The user equipment as claimed in claim 1, wherein if the FDD mode is applied to the primary cell, the processor demodulates FDD mode compliant downlink control information received by the transceiver for each carrier aggregation implemented cell, and if the TDD mode is applied to the primary cell, the processor demodulates TDD mode compliant downlink control information received by the transceiver for each carrier aggregation implemented cell.

3. The user equipment as claimed in claim 2, wherein the TDD mode compliant downlink control information includes one or more of a downlink DAI (Downlink Assignment Index) counted for each assignment of a downlink subframe, an uplink DAI indicative of a total number of assigned downlink shared channels, and a HARQ (Hybrid Automatic Repeat Request) process number indication bit.

4. The user equipment as claimed in claim 1, wherein if the FDD mode is applied to a cell for transmitting a physical uplink control channel in the cell group, the processor uses FDD mode compliant downlink control information for each cell in the cell group, and if the TDD mode is applied to the cell for transmitting the physical uplink control channel in the cell group, the processor demodulates TDD mode compliant downlink control information received by the transceiver for each cell in the cell group.

5. The user equipment as claimed in claim 4, wherein the cell for transmitting the physical uplink control channel in the cell group includes the primary cell.

6. A method in user equipment transmitting and receiving a radio channel to/from a base station via multiple cells configured for carrier aggregation in accordance with a frequency division duplex (FDD) mode and a time division duplex (TDD) mode, comprising:

determining whether a duplex mode applied to a primary cell in the multiple cells is either the FDD mode or the TDD mode; and receiving and demodulating downlink control information compliant with the determined duplex mode for each carrier aggregation implemented cell, wherein the multiple cells are managed in a per cell group basis where each cell group comprises multiple cells, and wherein the method further comprising:

determining whether a duplex mode applied to a cell for transmitting a physical uplink control channel (PUCCH) in each cell group is either the FDD mode or the TDD mode, and receiving and demodulating the downlink control information compliant with the determined duplex mode for each cell in each cell group.

* * * * *